United States Patent [19]

Wagner

[11] 4,294,208
[45] Oct. 13, 1981

[54] ATOMIZING SHOCK WAVE PRECOMBUSTOR

[75] Inventor: William R. Wagner, Los Angeles, Calif.

[73] Assignee: Rockwell International Corporation, El Segundo, Calif.

[21] Appl. No.: 135,389

[22] Filed: Mar. 31, 1980

[51] Int. Cl.³ ............................................. F02B 19/14
[52] U.S. Cl. ..................................... 123/285; 123/286
[58] Field of Search ............... 123/253, 280, 281, 282, 123/283, 285, 286, 275

[56] References Cited

U.S. PATENT DOCUMENTS

| | | | |
|---|---|---|---|
| 1,464,906 | 8/1923 | Hentschke | 123/254 X |
| 1,477,984 | 12/1923 | Suter | 123/254 |
| 1,525,776 | 2/1925 | French | 123/286 X |
| 2,133,478 | 10/1938 | Schlaefke | 123/275 X |
| 2,381,423 | 8/1945 | Buck | 123/286 X |
| 2,442,664 | 6/1948 | Roensch | 123/275 |
| 2,826,187 | 3/1958 | Meyer | 123/286 X |
| 2,853,060 | 9/1958 | Hockel | 123/281 X |
| 4,061,120 | 12/1977 | Hughes | 123/285 X |
| 4,146,005 | 3/1979 | Wimmer | 123/285 |

Primary Examiner—Tony M. Argenbright
Attorney, Agent, or Firm—H. F. Hamann; Harry B. Field

[57] ABSTRACT

A precombustor 10 for use in diesel engines comprises a precombustion chamber 12, a fuel spray nozzle port 18 through which a fuel spray nozzle 20 may be incorporated into the precombustion chamber 12, an igniter port 22 for an ignition means adjacent to said spray nozzle port 18, and a supersonic DeLaval nozzle 14 integrally incorporated into the precombustion chamber 12 opposite said spray nozzle port 18 for enhancing the injection of air into the precombustion chamber 12. Axially connected to the throat area of the DeLaval nozzle 14 is a two-dimensional subsonic diffuser 34 and flow passage 30 for transferring air from the diesel piston to the precombustion chamber 12 and combustion gases from the precombustion chamber 12 into the diesel cylinder.

14 Claims, 3 Drawing Figures

ATOMIZING SHOCK WAVE PRECOMBUSTOR

BACKGROUND OF THE INVENTION

1. Field of the Invention

The present invention pertains to diesel engines of the type having precombustion chambers and, more specifically, to improvements in those precombustion chambers which will permit greater efficiency.

2. Description of the Prior Art

Diesel engines designed according to the precombustion chamber system have the combustion chamber divided into a precombustion chamber, which is incorporated into the cylinder head, and a main combustion chamber which is positioned between the bottom edge of the cylinder head and the heads of the piston or crown. The precombustion chamber into which the fuel is injected and in which only a partial combustion takes place, is connected to the main combustion chamber by means of a narrow slot or flow passage.

In operation, as the piston moves in the direction of the cylinder head air is forced into the precombustion chamber, and at the end of this compression stroke fuel is injected into the precombustion chamber. Subsequently, a flame front is propagated down a flow channel from the precombustion chamber into a secondary combustion chamber formed in the piston head. The combustion of this fuel-air combination generates the thrust necessary to produce the power stroke of the piston.

It should be noted that the precombustion chamber, as well as the flow passages of prior art, have significantly different geometries than the present invention. In U.S. Pat. No. 4,122,804 to Kingsbury et al, precombustion chamber 50 is almost spherical in shape instead of having the elongated cylindrical geometry of the presently-claimed combustion chamber. Furthermore, it should be noted that flow passage 72 has acute angles in it as well as sharpedged orifices where the flow passage interconnects with the precombustion chamber. This basic simplistic design of the precombustion chamber and flow passage yields inherent efficiency problems as well as inherent problems of incomplete combustion.

SUMMARY OF THE INVENTION

Accordingly, there is provided by the present invention a means for atomizing fuel which is injected into a precombustor. Said means for atomizing the fuel comprises a precombustor 10 for use in diesel engines wherein the precombustor includes a precombustion chamber, a fuel spray nozzle port through which a fuel spray nozzle may be incorporated into the precombustion chamber, a port for an ignition means adjacent to said spray nozzle port, a supersonic DeLaval nozzle integrally incorporated into the precombustion chamber opposite said spray nozzle for enhancing the injection of air into the precombustion chamber, and a two-dimensional subsonic diffuser axially connected to the throat area of said DeLaval nozzle for transferring air from the diesel cylinder head to the precombustion chamber and combustion gases from the precombustion chamber into the diesel cylinder.

OBJECTS OF THE INVENTION

Therefore, it is an object of the present invention to provide a highly efficient diesel engine.

Another object of the present invention is to provide a diesel engine which burns fuel more completely.

Still another object of the present invention is to provide a diesel engine whose particulate matter output is significantly decreased.

Yet another object of the present invention is to provide a diesel engine which decreases the production of nitrous oxides.

A further object of the present invention is to provide a precombustion chamber wherein the fuel is axially injected into the precombustion chamber.

Still a further object of the present invention is to provide the combustion chamber with a supersonic DeLaval nozzle.

Yet another object of the present invention is to provide a flow passage with a subsonic DeLaval diffuser.

Another object of the present invention is to provide a precombustion chamber capable of generating normal shock waves which impinge upon fuel droplets, thereby atomizing the fuel droplets.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the Figures of the drawings are designated by the same reference characters.

DESCRIPTION OF THE PREFERRED EMBODIMENTS

Figure 1A:
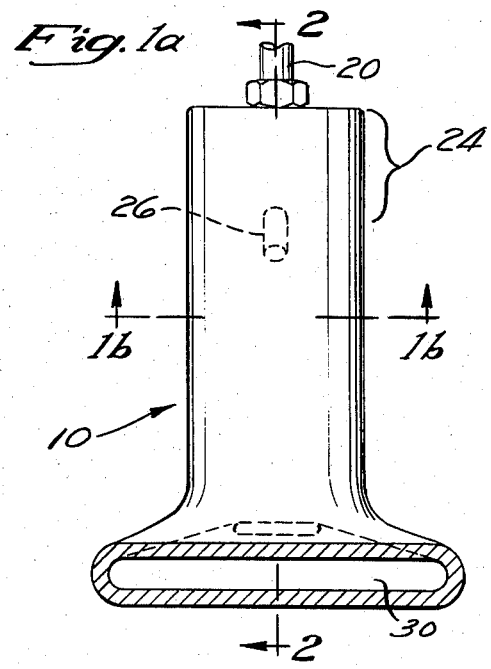
FIG. 1a is a front schematic view of the precombustor and flow passage.
Figure 1B:
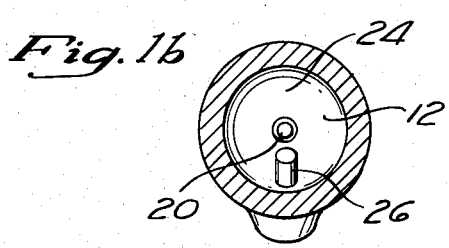
FIG. 1b is a cross-sectional view of FIG. 1a taken along the lines A—A.

In accordance with the present invention, there is provided a precombustor generally designated 10 which comprises a precombustion chamber 12 having a supersonic DeLaval nozzle generally designated 14 and an axisymmetric supersonic diffuser generally designated 16, a fuel spray nozzle port 18 through which a fuel spray nozzle 20 may be inserted, and igniter port 22 adjacent to said fuel spray nozzle port 18 for receiving the means for igniting a fuel-air mixture.

Although the precombustion chamber 12 may be of any conventional shape, the preferred shape for this precombustion chamber 12 is cylindrical. Furthermore, it would enhance performance if the cylindrically-shaped precombustion chamber 12 had a domed top area generally designated 24 through which the spray nozzle port 18 was axially oriented. A more preferred configuration for the precombustion chamber 12 would have the cylindrical length-to-diameter (L/D) ratio being in the range from about 2 to about 5, and the most preferred L/D ratio would be about $3\frac{1}{2}$. This L/D ratio enhances the production of the optimum normal shock waves needed to help atomize fuel spray droplets.

The fuel spray nozzle 20 may be of any conventional type. However, the pencil-type fuel spray injection nozzle described in U.S. Pat. No. 4,122,804 to Kingbury et al would be most preferred and is corporated herein by reference.

A conventional glow plug 26 or heat plug can then be incorporated through igniter port 22 to provide the ignition source for the fuel-air mixture.

Figure 2:
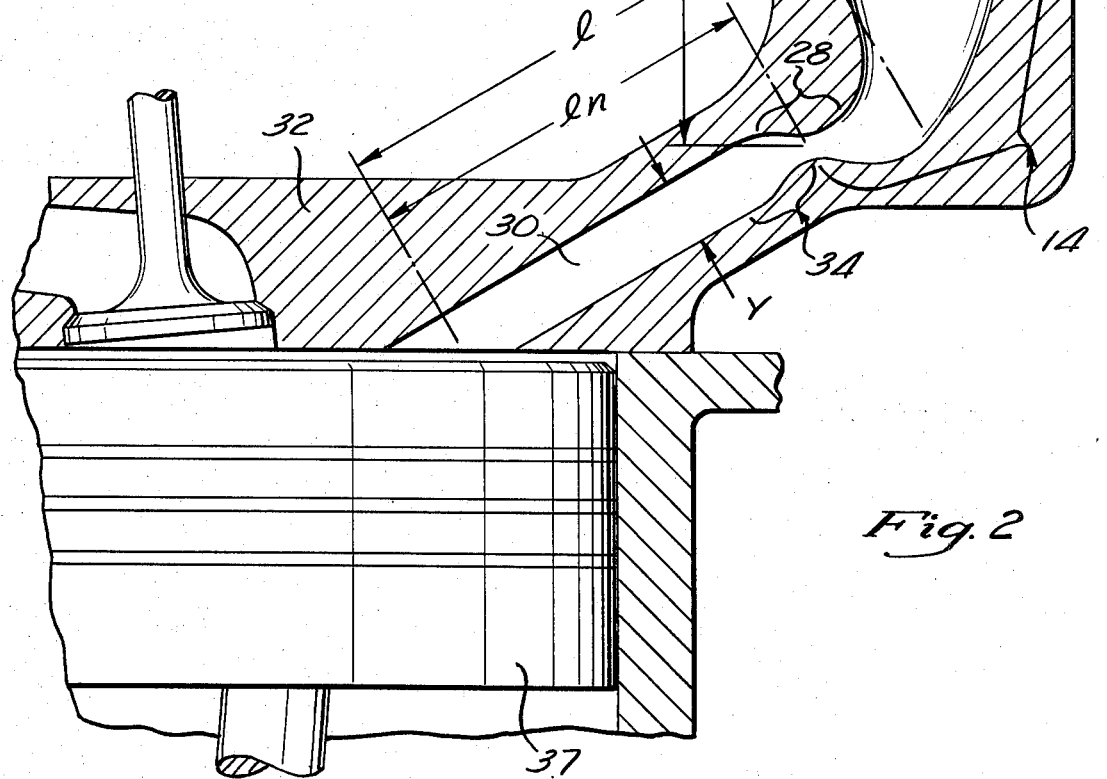
FIG. 2 is a fragmentary cross-sectional view through the precombustion chamber of FIG. 1a as viewed from the plane indicated by line B—B and showing its connection to its piston and cylinder head.

The DeLaval nozzle 14 of the precombustion chamber 12 comprises throat area generally designated 28, supersonic nozzle 14, and axisymmetric diffuser 16. Although DeLaval nozzle 14 may be axially oriented and opposite the spray nozzle port 18, space limitations may require that the supersonic DeLaval nozzle 14 have a curved orientation as shown in FIG. 2. In that case, the design of the curved supersonic nozzle 14 and the axisymmetric supersonic diffuser 16 can be specified by a transient method of characteristics. A thorough discussion of the DeLaval nozzle and the means for calculating specific nozzle geometries can be found in Chapter 3 "Nozzle Theory and Thermodynamic Relations" of the 2nd Edition of *Rocket Propulsion Elements* by Sutton, Chapman & Hall, Ltd. 1956, as well as in *The Dynamics and Thermodynamics of Compressible Fluid Flow*, Ascher H. Shapiro, Ronald Press Company, 1953. Specific computerized methods of characteristic solutions for curved nozzles are available through NASA, Air Force, and many aerospace companies, including Rocketdyne Division of Rockwell International.

Performance of precombustor 10 can further be enhanced by incorporation of flow passages 30 connecting cylinder head 32 with the throat 28 of the supersonic DeLaval nozzle 14. The geometry of the flow passage, like the geometry of the precombustion chamber, is critical in enhancing the efficiency and the thermodynamic characteristics of the precombustion chamber 12. The length-to-thickness ($L_n/Y$) ratio of the two-dimensional flow passage 30 should lie between about 5 to about 10, with the preferred length-over-thickness ratio of about 7. The flow passage 30 is interconnected through its two-dimensional subsonic DeLaval diffuser 34 with the throat 28 of the supersonic DeLaval nozzle 14. The combination of the two-dimensional subsonic DeLaval diffuser 34 with the supersonic DeLaval nozzle 14 through throat 28 form what is conventionally known as a convergingdiverging DeLaval nozzle.

In operation, the precombustor generally designated 10 is used to provide a supersonic shock wave 36 during the compression stroke of the piston 37 to atomize the fuel on an instantaneous basis without developing a small orifice size high $\Delta P$ injector. In accordance with this design, flow is compressed by piston 37 during the compression stroke and enters piston end 40 of flow passage 30. The air which is forced into flow passage 30 is then forced through the converging/diverging DeLaval nozzle where it expands through the axisymmetric diffuser 16, creating a plurality of normal shock waves 36.

The normal shock waves 36 created by the DeLaval supersonic nozzle 14 and axisymmetric diffuser 16 traverse the length of the precombustion chamber 12 and impinge upon the incoming fuel spray 38 from the fuel injector 20. The impact of the shock wave upon the spray particles 38 vaporized the fuel on an instantaneous basis before the local pressure builds by up either filling of the top region 24 of the precombustion chamber 12 or by the ensuing deflagration wave generation which causes the shock wave pressure difference to increase and the pressure pattern to decrease in distance and in size from the throat plane.

At combustion commencement, the incoming flow ceases to be supersonic within the precombustion chamber 12 and reverses direction flowing from the spray nozzle 20 in toward the throat 28 there the diffusion in the region from the throat to the piston end of flow passage 30 recovers a substantial fraction of the throat dynamic head.

It should be noted that although the two-dimensional diffuser 34 should preferably be slightly subsonic, a sonic or slightly supersonic geometry would also work.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A precombustor for use in diesel engines, comprising:
    a precombustion chamber;
    a fuel spray nozzle port through which a fuel spray nozzle may be incorporated into said precombustion chamber;
    a port for an ignition means adjacent to said spray nozzle port; and
    a supersonic DeLaval nozzle integrally incorporated into said precombustion chamber opposite said spray nozzle, for enhancing the injection of air into said precombustion chamber.

2. The precombustor of claim 1 wherein said precombustion chamber is cylindrical.

3. The precombustor of claim 2 wherein said precombustion chamber has a length-to-diameter ratio in the range from about 2 to about 5.

4. The precombustor of claim 3 wherein said precombustion chamber has a length-to-diameter ratio of about $3\frac{1}{2}$.

5. The precombustor of claim 2 wherein said precombustion chamber further comprises a dome-shaped top.

6. The precombustor of claim 2 wherein said spray nozzle port is axially located through the top of said precombustion chamber.

7. The precombustor of claim 1 wherein said fuel spray nozzle is a penciltype fuel injection nozzle.

8. The precombustor of claim 1 wherein said ignition means is a glow plug.

9. The precombustor of claim 2 wherein said DeLaval nozzie is axially oriented.

10. The precombustor of claim 2 wherein said DeLaval nozzle comprises a curved supersonic nozzle.

11. The precombustor of claims 9 or 10 wherein said DeLaval nozzle further comprises an axisymmetric diffuser.

12. The precombustor of claim 1 further comprising a two-dimensional subsonic diffuser axially connected to the throat of said supersonic DeLaval nozzle.

13. The precombustor of claim 1 further comprising a two-dimensional sonic diffuser axially connected to the throat of said supersonic DeLaval nozzle.

14. The precombustor of claim 1 further comprising a two-dimensional supersonic diffuser axially connected to the throat of said supersonic DeLaval nozzle.

* * * * *

UNITED STATES PATENT AND TRADEMARK OFFICE
CERTIFICATE OF CORRECTION

PATENT NO. : 4,294,208
DATED : October 13, 1981
INVENTOR(S) : William R. Wagner

It is certified that error appears in the above-identified patent and that said Letters Patent are hereby corrected as shown below:

Column 3, line 42, delete "convergingdiverging" and insert --converging-diverging--.
Column 3, line 62, delete "by up" and insert --up by--.

Signed and Sealed this

Second Day of March 1982

[SEAL]

Attest:

GERALD J. MOSSINGHOFF

*Attesting Officer*  *Commissioner of Patents and Trademarks*